United States Patent [19]

Gostanian et al.

[11] Patent Number: 5,781,910
[45] Date of Patent: Jul. 14, 1998

[54] PREFORMING CONCURRENT TRANSACTIONS IN A REPLICATED DATABASE ENVIRONMENT

[75] Inventors: Richard K. Gostanian, Bronx, N.Y.; John E. Ahern, Sudbury, Mass.

[73] Assignee: Stratus Computer, Inc., Marlborough, Mass.

[21] Appl. No.: 710,135

[22] Filed: Sep. 13, 1996

[51] Int. Cl.[6] .................................................. G06F 17/30
[52] U.S. Cl. .................... 707/201; 707/8; 707/10
[58] Field of Search ........................... 707/10, 104, 200, 707/8, 201

[56] References Cited

U.S. PATENT DOCUMENTS

| | | | |
|---|---|---|---|
| 5,280,612 | 1/1994 | Lorie et al. | 707/8 |
| 5,280,619 | 1/1994 | Wang | 395/726 |
| 5,333,265 | 7/1994 | Orimo et al. | 395/200.31 |
| 5,483,652 | 1/1996 | Sudama et al. | 707/10 |
| 5,632,031 | 5/1997 | Velissaropoulos et al. | 707/100 |
| 5,680,551 | 10/1997 | Martino, II | 395/200.15 |
| 5,696,901 | 12/1997 | Konrad | 395/200.09 |
| 5,701,457 | 12/1997 | Fujiwara | 707/8 |

OTHER PUBLICATIONS

Ceri, Stefano et al., *Distributed Databases—Principles and Systems*, McGraw-Hill, Inc. 1984, U.S.A., pp. 186–195.

Triantafillou, Peter, et al., *IEEE Transactions on Software Engineering*, "The Location-Based Paradigm for Replication: Achieving Efficiency and Availability in Distributed Systems", vol. 21, No. 1, Jan. 1995, pp. 1–18.

Hadzilacos, Vassos et al., *Distributed Systems*, "Fault-Tolerant Broadcasts and Related Problems", 2nd Ed., edited by S. Mullender, Addison–Wesley, 1993, pp. 97–145.

Birman, Kenneth P., *Communications of the ACM*, "The Process Group Approach to Reliable Distributed Computing", Dec. 1993, Association for Computing Machinery, pp. 27–57.

Schneider, Fred B., *ACM Computing Surveys 22*, "Implementing Fault-tolerant Services using the State-Machine Approach: A Tutorial", Dec. 1990.

*Primary Examiner*—Paul R. Liintz
*Attorney, Agent, or Firm*—Cesari and McKenna, LLP

[57] ABSTRACT

An actively replicated, fault-tolerant database system based on a state machine approach that supports the concurrent execution of multiple transactions requested by a plurality of application clients communicating with the system. The system includes a plurality of database servers for storing system data and an application server layered over each database server for controlling the access to and the manipulation of data stored at the underlying database server. The application servers replicate system data to at least one other database server and coordinate the execution of transactions at each database server to ensure consistent data replicas across the system. More specifically, the application servers administer one of two preselected, novel coordination protocols governing the execution of each database-dependent transaction. The protocols assure transaction atomicity and consistent data replication across the entire system as well as continued processing despite database server and communications failures.

42 Claims, 6 Drawing Sheets

PREFORMING CONCURRENT TRANSACTIONS IN A REPLICATED DATABASE ENVIRONMENT

FIELD OF THE INVENTION

The present invention relates generally to database management systems and, more particularly, to a replicated database system that is capable of performing concurrent transactions while utilizing a state machine approach to provide fault-tolerance.

BACKGROUND OF THE INVENTION

Computerized databases are commonly used to store large amounts of data for easy access and manipulation by multiple users. In a centralized computer system, there is a single copy of the data stored at one location, typically a computer. By maintaining a single, centralized database, such a system avoids inconsistencies which might otherwise occur with more than one copy of the data. Nevertheless, the centralized database approach has several drawbacks. First, since only one copy of the data exists, if the data becomes corrupted or inaccessible, the entire system becomes unavailable. Second, with only one copy of data available for read and update purposes, the system may appear slow and time-consuming, especially to multiple users.

Consequently, many of today's organizations, especially those dispersed over several locations, utilize some type of distributed database system. In a distributed system, an organization's data is spread across the storage facilities of several computers or processors. These storage facilities may be located throughout a single building, across several adjacent buildings or at different locations across the country or around the world. These computers or processors are interconnected via a communications network and are referred to as sites or nodes. Each site, moreover, is able to process local transactions which access data retained only at that local storage facility as well as distributed transactions which access data stored on more than one computer.

Computerized databases, both centralized and distributed, are often used to execute transactions. A transaction is a set of data-dependent operations requested by a user of the system. For example, a user may request some combination of retrieval, update, deletion or insertion operations. The completion of a transaction is called a commitment and the cancellation of a transaction prior to its completion is referred to as an abort. If a transaction is aborted, then any partial results (i.e., updates from those operations that were performed prior to the abort decision) must be undone. This process of returning the data items to their original values is also referred to as a roll back. An important aspect of a transaction is atomicity. Atomicity means that all of the operations associated with a particular transaction must be performed or none of them can be performed. That is, if a transaction is interrupted by a failure, the transaction must be aborted so that its partial results are undone (i.e., rolled back) and, if the transaction is completed, the results are preserved (i.e., committed) despite subsequent failures. The classic example of atomicity concerns a transfer of bank funds from account A to account B. Clearly, the system must either perform both the withdrawal and the deposit operations of the transaction or neither operation.

To protect against disruptions caused by the failure of any particular site, most distributed database systems allow additional copies or "replicas" of the data to be made at other sites. That is, a copy of each data item stored on one of the system's database facilities may also exist at the database facilities of other sites. By replicating the data across multiple instances of database facilities, a certain degree of fault-tolerance may be obtained. Furthermore, by having a locally available replica of the database available, the response time of certain transactions may be improved.

Although replicated systems provide the above advantages over non-replicated systems, there are nonetheless inherent costs associated with the replication of databases. To update a single data item, at least one message must be propagated to every replica of that data item, consuming substantial communications resources. Furthermore, in order to manage multiple databases and handle the execution of concurrent transactions, a complicated administrative support mechanism is required. In addition, if the replicated system cannot guarantee consistent updates at all replicas, data integrity may be compromised.

Most commercially available replicated database systems utilize either a distributed transaction approach or a primary-backup approach to replicate the data. In the distributed transaction approach, all database replicas are updated with a single, distributed transaction. That is, whenever a data item is updated by a transaction, all copies or replicas of that data item are updated as part of the same transaction. This approach results in completely synchronized replicas. To ensure atomicity, distributed transaction-based systems must employ an atomic commit protocol, such as the well-known 2 Phase Commit ("2PC") protocol. The basic idea behind 2PC is to determine a unique decision for all replicas with respect to either committing or aborting a transaction and then executing that decision at all replicas. If a single replica is unable to commit, then the transaction must be aborted at all replicas.

More specifically, under the 2PC protocol, a single database manager associated with a single database facility is chosen as the coordinator of the transaction. The coordinator first asks all of the participants (i.e., the other replicas) including itself (if the coordinator is a participant) to prepare for the commitment of a transaction. Each participant replies to the coordinator with either a READY message, signaling that the participant is ready and willing to commit the transaction, or an ABORT message, signaling that the participant is unable to commit the transaction. Before sending the first prepare message, the coordinator typically enters a record in a log stored on stable storage, identifying all of the replicas participating in the transaction. The coordinator also activates a time-out mechanism. Based on the replies received from the participants, the coordinator decides whether to commit or abort the transaction. If all participants answer READY, the coordinator decides to commit the transaction. Otherwise, if at least one participant replies with an ABORT message or has not yet answered when the time-out expires, the coordinator decides to abort the transaction.

The coordinator begins the second phase of 2PC by recording its decision (i.e., commit or abort) in the log. The coordinator then informs all of the participants, including itself, of its decision by sending them a command message, i.e., COMMIT or ABORT. In response, all of the participants write a commit or abort record in their own logs. Finally, all participants send a final acknowledgment message to the coordinator and execute the relevant procedures for either committing or aborting the transaction. The acknowledgment message, moreover, is not simply an acknowledgment that a command has been received, but is a message informing the coordinator that the command has been recorded by the participant in its stable log record. When the coordinator receives the acknowledgment messages from the participants, it enters a "complete" record in its log.

Although widely implemented, the 2PC protocol nonetheless has several disadvantages. First, as set forth above, the protocol requires each replicated database facility to submit a READY message before the transaction can be committed. Thus, in a fully replicated environment, any site or link failure brings all activity to a complete halt until the site or link is repaired, since that site cannot transmit a READY message. That is, until the failed site is recovered, no further transactions may be executed by a system relying on 2PC. Second, 2PC requires the transmission of at least three messages per replicated database per transaction. The protocol thus consumes substantial communications resources and reduces the system's response time and throughput. Third, 2PC requires both the coordinator and all participants to record the commit/abort decision and the final outcome to stable storage. This involves two forced disk writes per participant per transaction, adding significant overhead to this protocol. Other protocols, such as Quorum Consensus, have been proposed as a solution to the first problem, but these other protocols impose even more communications overhead than 2PC and, as a result, they have not been utilized in commercial systems.

In the primary-backup approach, all transactions update a single, specific replica site, referred to as the primary site. These updates are later copied to the other replicas in the system, which are referred to as backup replica sites. The precise manner in which the updates are propagated to the backup sites varies from implementation to implementation. For example, some systems update the backup replica sites as soon as possible, typically resulting in minimal delays of several seconds. Others update the backup sites at specific time intervals or after a specific number of transactions have committed at the primary site. Some systems, moreover, perform the backup function by transferring entire recovery logs in order to perform the transactions at the other backup sites. Still others create a deferred log of transaction requests which are later used to do the updates. Commercial products incorporating the primary-backup approach to replication include Sybase Replication Server, the Oracle Snapshot Facility, Oracle Symmetric Replication, Oracle Standby Database, Ingres/Replicator and DB2 Data Propagator.

One of the apparent advantages of the primary-backup approach is the ability to create a highly available database system by replacing a failed primary with one of the backups, allowing he backup to become the new primary. This approach, however, has several drawbacks. First, update propagation to the backups typically generates a large amount of network traffic, consuming significant network resources. Second, regardless of the precise manner by which updates are propagated, the backups will always lag the primary. Transactions, moreover, are typically executed serially at the backup sites to avoid data inconsistencies resulting from possibly different execution orders at the primary and backup sites. Hence, in high volume applications, backup sites can lag the primary by tens if not hundreds of transactions. This has serious data consistency consequences both during normal processing and, in particular, after failures.

During normal processing, applications typically access the backups for read-only purposes to improve processing capabilities. Nonetheless, as mentioned above, data at the backup sites may be stale, causing potential problems depending on application requirements. Furthermore, after a primary site failure, both database and real world inconsistencies are likely to arise due to update decisions at the new primary based on stale data. For example, if the sale of the last widget in stock was recorded at the primary site but not propagated to any of the backup sites by the time of a primary failure, then the last widget may be sold a second time by a transaction executing at the new primary.

In addition to being prone to data inconsistencies, the primary-backup approach does not automatically allow for transparent failover to a backup site after a primary failure. First, after a primary failure, application clients must be switched over to a new primary. This process involves significant time during which the system is unavailable. Second, since the backup sites are not always consistent with each other, difficulties arise choosing a new primary from the various backups. Moreover, failures that result in network partitions may result in more than one backup declaring itself the new primary.

In addition to the distributed transaction and primary-backup approaches to database replication, at least one attempt has been made to utilize state machines as a basis for replicating data at different sites. This system, however, requires all transactions to be executed serially at all replicas and thus does not support the concurrent execution of transactions. Basically, a state machine is a entity containing a set of states and a set of commands which transform those states such that all of the new states are also contained within the machine. The prior state of the art of the state machine approach to replication management is described in F. Schneider *Implementing Fault-tolerant Services using the State-Machine Approach: A Tutorial ACM Computing Surveys* 22 (December 1990). The basic idea of the state machine approach is to start with some number of state machines, and arrange for commands to be sent to all state machines where they may concurrently and independently execute. In order to achieve consistent data replication, however, the commands must be deterministic. That is, the commands must produce identical results when operating on identical states. The requirement that commands be deterministic presents a significant problem in applying this approach to database systems (or, more generally, to transaction-based systems) and the present invention is directed to solving this problem.

There are basically three sources of non-determinacy when applying state machines to replicated database systems. First, a transaction may include operations that depend on local database conditions that may vary across the databases. For example, a transaction may be dependent on the time at a local database clock. Clearly, the local clock times may vary across the different databases and thus a transaction relying on the local clock time would introduce inconsistent results across the databases. Similarly, a transaction that depends on the local data storage conditions may introduce non-determinacy. For example, a transaction that says "book a 9:00 a.m. flight from Los Angeles to New York on October 1" may introduce non-determinacy since there may be more than one such flight (e.g., USAir and American Airlines) and thus the replicas may book different flights, depending on which such flight they choose in their respective databases.

A second source of non-determinacy occurs if a transaction succeeds (i.e., commits) at one replica but fails (i.e., aborts) at another replica. In this case, certain data items at one replica may be updated to new values while the same data items are left unchanged in a second replica. This may occur, for example, where one replica has insufficient storage space to commit an insert transaction, while the remaining replicas do have sufficient storage capacity to complete the transaction.

A third source of non-determinacy is where a transaction executes out of order relative to its execution at other replicas. More specifically, the final state of certain data items may be different depending on the order in which particular transactions are executed at a database. For example, a pair of transactions, $T_1$, and $T_2$, executing across a database system is provided below with reference to FIG. 1. Suppose transaction $T_1$ is issued at the same time as transaction $T_2$, where $T_1$ and $T_2$ are:

| T1: begin | T2: begin |
|---|---|
| b = b + 1 | c = c + 1 |
| a = a + 1 | a = a * 2 |
| commit | commit |

IN addition, assume that the initial values of a,b and c are: a=2, b=1 and c=1. FIG. 1 illustrates a possible schedule of transactions $T_1$ and $T_2$ in databases $D_1$ and $D_2$. The serialization order of each of the transactions in each of the databases is illustrated in column form, with time increasing as the transaction progresses down the column.

Although $T_1$ begins before $T_2$ in both replicated databases $D_1$ and $D_2$, the operations associated with those transactions proceed in different orders in each replica. This may be due to any number of database-specific circumstances, such as operating system process scheduling, database server transaction scheduling, system load, processor speed, etc. Regardless of the specific cause, the serialization order in database $D_1$ is $T_1$ followed by $T_2$, whereas in database $D_2$ the order is $T_2$ followed by $T_1$. As shown in FIG. 1, the final value of data item "a" is different in each replica $D_1$ and $D_2$. Thus, the two databases are now inconsistent. If such transactions are to be supported, the system must include some mechanism to control the order in which these transactions are executed at each replicated database.

SUMMARY OF THE INVENTION

It is an object of the present invention to provide a replicated database system utilizing a state machine approach such that the system is capable of concurrently processing multiple transactions.

It is a further object of the present invention to provide a replicated database system with improved throughput over the prior art systems.

It is a further object of the present invention to allow the continued execution of transactions despite site and/or communications failures.

It is a further object of the present invention to provide transparent failover in the case of site and/or communications failures.

Briefly, the invention relates to a system and method that utilizes a state machine approach to create a replicated, fault-tolerant database system capable of coordinating the execution of concurrent transactions. The system includes a plurality of database servers that may be accessed and manipulated by a plurality of application clients. Specifically, the application clients issue calls to application servers requesting the execution of particular transactions. The application servers, which are associated with the database servers and in the illustrated embodiment are layered over each database server, include processes for replicating the data items across the system and for coordinating the manipulation and update of the replicated data items involved in the requested transaction. These processes may comprise a manager process that coordinates the execution of transactions at each replica and a set of worker processes that interact directly with the associated database server. To ensure transaction atomicity and data consistency at each replicated database server, the application servers execute one of two novel commit protocols. These protocols permit the concurrent execution of multiple transactions at each database facility and allow the system to continue processing transactions despite communication and database server failures.

More specifically, for each transaction requested by the application clients, there is a single application server designated by the system as the coordinator for that transaction. The coordinator is responsible for making and coordinating the commit or abort decision. The remaining application servers, i.e., those servers that are associated with a database facility containing a replication of the data items involved in the transaction, are referred to as cohorts. Depending on the nature of the transaction as described below, the coordinator will utilize either one of the novel protocols, namely: 1 Phase Coordinated Commit Protocol ("1PCC") or 2 Phase Coordinated Commit Protocol ("2PCC").

Under 1PCC, the coordinator and the cohorts independently update the data items referenced by the transaction. When the coordinator has finished its updates, it then decides whether the transaction can be committed or whether the transaction must be aborted. The commit/abort decision reached by the coordinator is then communicated to the cohorts by means of an atomic multicast. An atomic multicast is essentially a broadcast technique for sending messages from one process (here, the coordinator) to other processes (here, the cohorts) with the property that the message is either delivered (not just received) to all of the processes (i.e., cohorts) or to none of them. Upon receiving an acknowledgment that its message has been delivered to all surviving cohorts, the coordinator performs its own commit or abort. Significantly, the coordinator need not receive a READY message in the manner of 2PC from any cohort in order to execute its own decision. Instead, the coordinator may proceed to commit a transaction after receiving an acknowledgment that its decision has been received by the surviving cohorts, i.e., those cohorts that have not failed. Each surviving cohort then follows the action of the coordinator (i.e., commit or abort) after having completed its own updates to the relevant data items.

Under 2PCC, the coordinator and cohorts update the relevant data items as required by the requested transaction. When the coordinator completes its updates or a transaction-specific time-out expires, it then activates a new time-out and issues a request to the cohorts, via atomic multicast, asking whether each cohort is ready to commit or must abort the transaction. The coordinator then waits for the replies from the surviving cohorts or for the new time-out to occur. This part of the 2PCC protocol is known as the "rendezvous step". Unlike 2PC, the 2PCC protocol does not require a READY message from all participants to a transaction. Instead, the 2PCC need only receive a status message from the surviving cohorts. The 2PCC protocol also does not require recording information to stable storage as 2PC. If the transaction-specific time-out occurs (e.g., either the coordinator or one of the cohorts could not complete its updates) or if at least one of the cohorts replies with an abort message, then the coordinator instructs all surviving cohorts to abort the transaction by issuing another atomic multicast. Alternatively, if all of the surviving cohorts reply to the coordinator with a ready to commit message before the second time-out expires, then the coordinator instructs those cohorts to commit the transaction by atomic multicast. Finally, if the second time-out expires, then the coordinator instructs the cohorts to abort. As in the 1PCC protocol, the coordinator need only receive an acknowledgment that its decision has been delivered to each of the surviving cohorts, in order to commit a transaction.

1PCC, though more efficient by lacking the rendezvous step, does not ensure consistent serialization orders in all database servers and thus is only suitable for transactions whose results are independent of the order in which they are executed relative to other transactions. 2PCC, on the other hand, ensures consistent serialization orders at each database facility for all transactions which run at a serialization level guaranteeing repeatable reads and "phantom" protection as described below. Since these novel protocols are only concerned with the surviving cohorts, they are able to commit transactions despite cohort failure. In addition, coordinator failure is handled by automatically designating one of the cohorts as the new coordinator, thereby providing significant increased availability of the system. Consequently, the system provides improved fault-tolerance over conventional replicated systems by essentially ignoring the failed replicas. That is, processing continues in all surviving replicas with the failures being totally transparent to the application clients.

BRIEF DESCRIPTION OF THE DRAWINGS

The above and further advantages of the invention may be better understood by referring to the following description in conjunction with the accompanying drawings, in which.

DETAILED DESCRIPTION OF THE PREFERRED EMBODIMENTS

Figure 1:
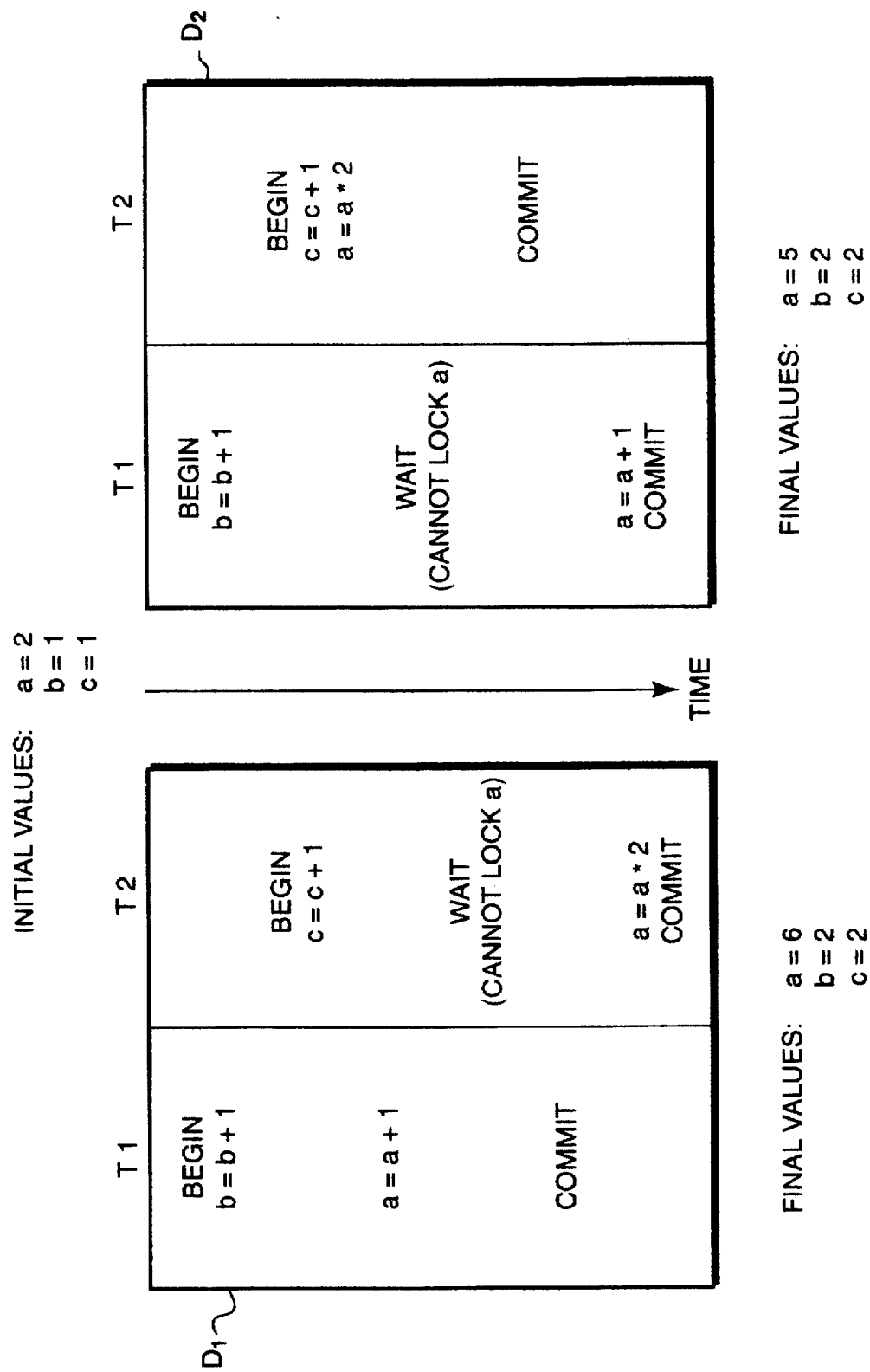
FIG. 1 (previously discussed) is a timing chart of two transactions executing concurrently across two databases.
Figure 2:
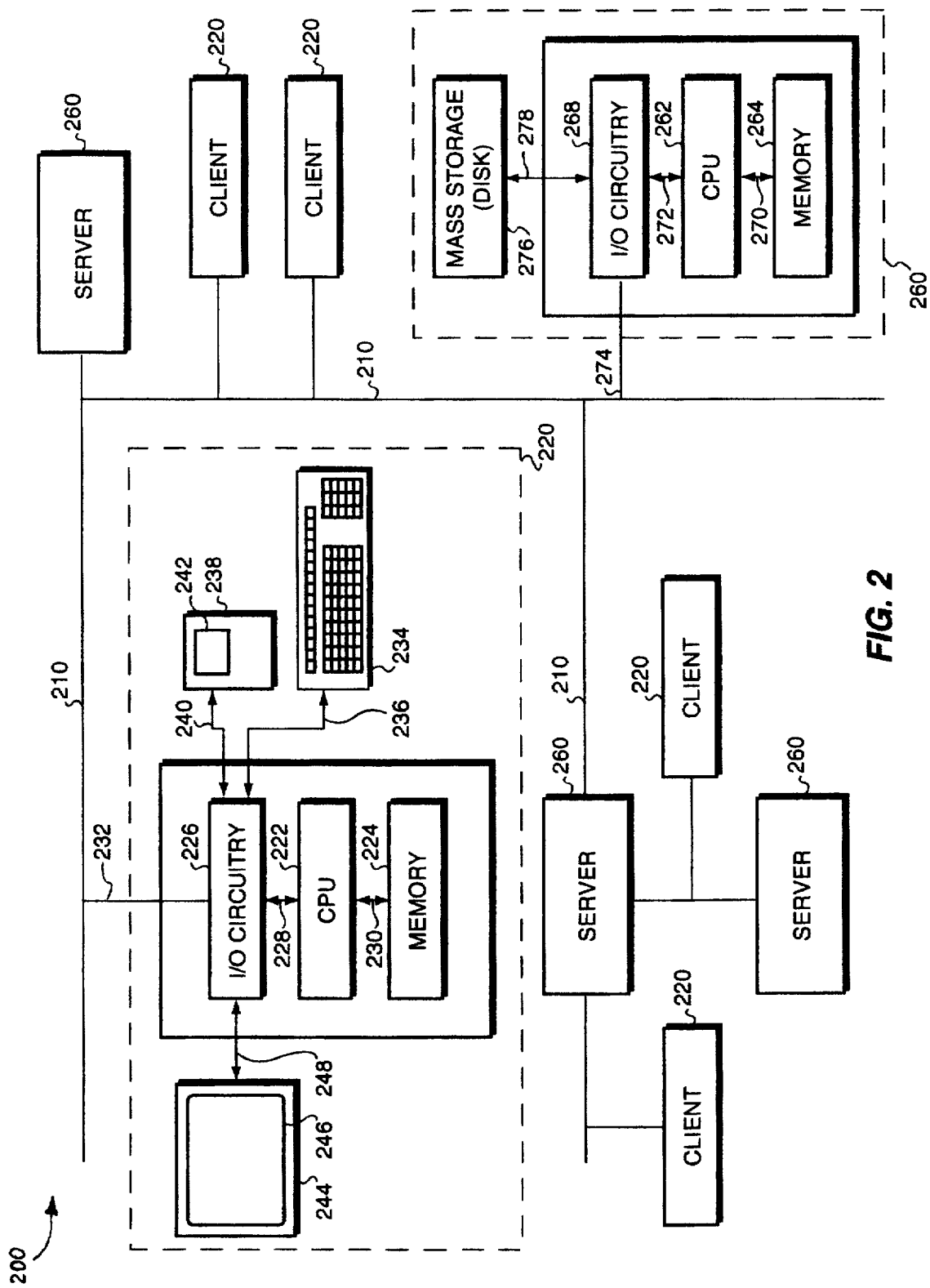
FIG. 2 is a block diagram of a network system including a collection of computer networks interconnected by client and server computers.

FIG. 2 is a block diagram of a database system 200 comprising a collection of computer networks 210 interconnected by client computers ("clients") 220, e.g., workstations or personal computers, and server computers ("servers") 260. The servers 260 are typically computers having hardware and software elements that provide resources or services, such as database access, for use by the clients 220 to increase the efficiency of their operations. It will be understood to those skilled in the art that, in an alternate embodiment, the client and server may exist on the same computer platform. In still yet another alternate embodiment of the invention, the computing platform may comprise any network-centric platform that includes a computing device configured to interact with a server. However, for ease of description and depiction, the computing platform described herein comprises separate client and server computers.

Several types of computer networks 210, including local area networks (LANs) and wide area networks (WANs), may be employed in the system 200. A LAN is a limited area network that typically consists of a transmission medium, such as coaxial cable or twisted pair, while a WAN may be a public or private telecommunications facility that interconnects computers that are widely dispersed. In the illustrative embodiment, the network system 200 is a WAN of geographically distributed computer networks.

Computers coupled to a network typically communicate by exchanging messages and information according to predefined networking protocols. Execution of these networking protocols allow users to interact and share information across the networks. As an illustration, in response to a user's request for a particular service, the client 220 sends an appropriate message to the server 260, which performs the service and returns a message and/or information back to the client 220.

As shown in FIG. 2, a typical hardware configuration of a client 220 includes a central processing unit (CPU) 222 coupled between a memory 224 and input/output (I/O) circuitry 226 by bi-directional buses 228 and 230. The memory 224 typically comprises random access memory (RAM) for temporary storage of information and read only memory (ROM) for permanent storage of the computer's configuration and basic operating commands, such as portions of an operating system (not shown). As described further herein, the operating system controls the operations of the CPU 222 and the client computer 220.

The I/O circuitry 226, in turn, connects the client computer 220 to the computer networks 210 via a bi-directional bus 232 and to cursor/pointer control devices, such as a keyboard 234 (via cable 236) and a mouse 238 (via cable 240). The mouse 238 typically contains at least one button 242 operated by a user of the client computer 220. A conventional display monitor 244 having a display screen 246 is also connected to I/O circuitry 226 via cable 248. The I/O circuitry 226 receives information, such as control and data signals, from the mouse 238 and keyboard 234, and provides that information to the CPU 222 for display on the screen 246 or, as described further herein, for transfer over the network system 200.

FIG. 2 further illustrates a typical hardware configuration of a server 260 of the network system 200. The server 260 has many of the same units as employed in the client 220, including a CPU 262, a memory 264 and I/O circuitry 268, each of which are interconnected by bi-directional buses 270 and 272. The I/O circuitry 268 also connects the computer server 260 to computer networks 210 via a bi-directional bus 274. These server units 260 are typically configured to perform functions similar to those provided by their corresponding units, e.g. database access, in the network system 200. Accordingly, the server 260 includes a mass storage unit 276, such as a disk drive, connected to the I/O circuitry 318 via bi-directional bus 278.

It is to be understood that the I/O circuits 226, 268 within the computers 220, 260 contain the necessary hardware, e.g., buffers and adapters, needed to interface with the control devices 234, 238, the display monitor 244, the mass storage unit 276 and the network system 200. Moreover, the operating system includes the necessary software drivers to control, e.g., network adapters within the I/O circuits 226, 268 when performing I/O operations, such as the transfer of messages and information between the client 220 and the server 260.

The computers may be UNIX workstations, such as those sold by Sun Microsystems or Hewlett Packard, or personal computers of the IBM® series of computers sold by International Business Machines Corp. These computers have resident thereon, and are controlled and coordinated by operating system software, such as UNIX, the Microsoft® Windows NT® or IBM OS2®.

Figure 3:
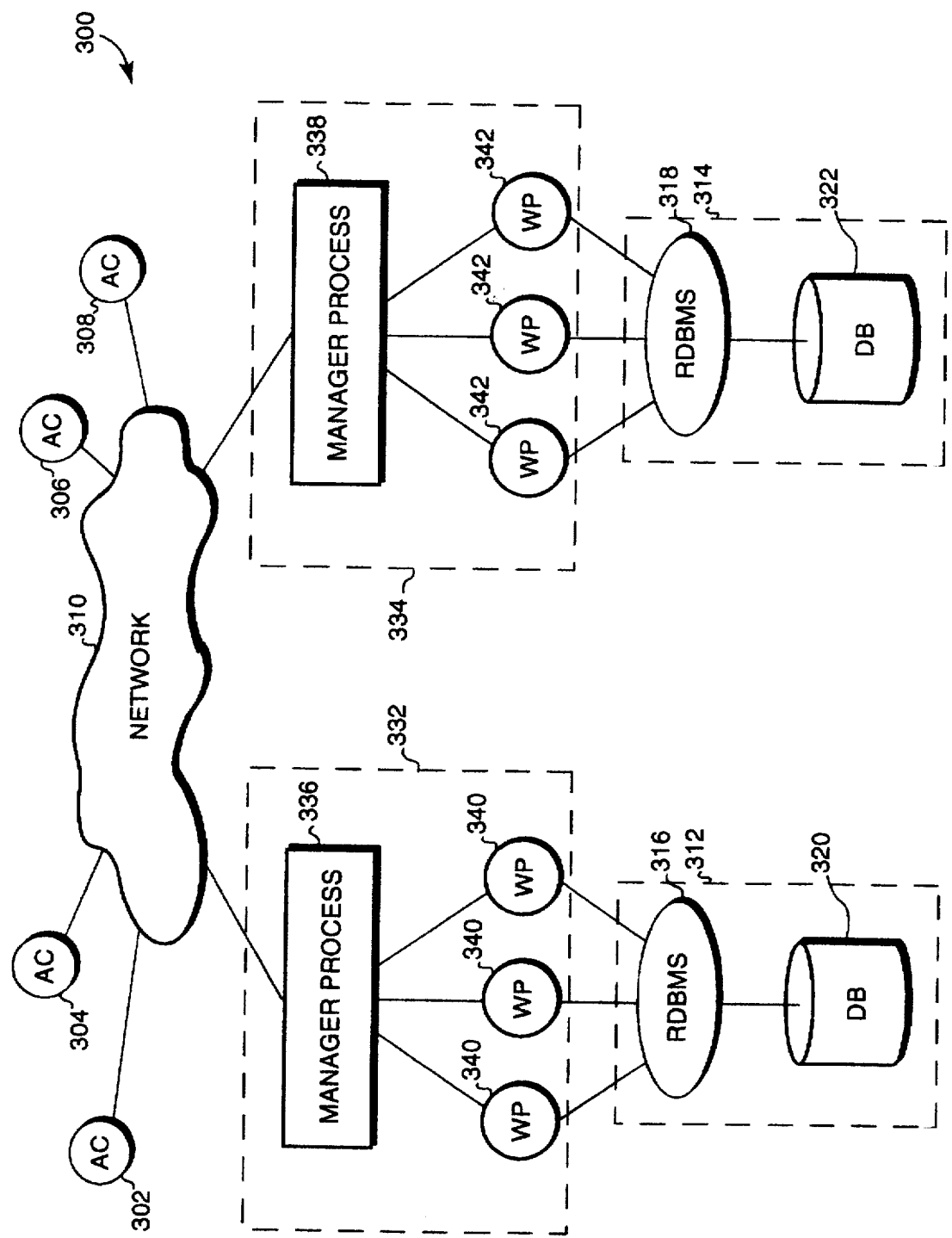
FIG. 3 is a highly schematized block diagram of a layered component arrangement in accordance with the invention.

FIG. 3 is a highly schematized diagram of the software elements of a replicated database system 300 according to the present invention. The system 300 preferably includes a plurality of application clients 302, 304, 306, 308. Each application client 302-308 is essentially an application program that preferably resides on a client computer 220 (FIG. 2). Each application client 302-308, moreover, may be connected to a communications network 310. The communications network 310, which is similar to the computer networks 210 of FIG. 2, may be any conventional LAN, WAN or network-centric system. The system 300 further includes at least two database server sites 312, 314. Each database server 312, 314 preferably includes a conventional, non-replicated relational database management system ("RDBMS") 316, 318, such as those manufactured by ORACLE® or SYBASE®. Each database server 312, 314, which preferably resides on its own server computer 260 (FIG. 2), further includes an associated data storage device 320, 322, respectively. Each database management system 316, 318 directly accesses and manipulates the data stored on its corresponding data storage device 320, 322.

It should be understood that, rather than comprising relational database management systems, the database server sites may comprise object-oriented data management systems or any other type of non-replicated data management systems which support transactions.

Associated with each database site 312, 314 is an application server 332, 334, respectively. As illustrated in FIG. 3, the application servers 332, 334 may be layered over their respective database sites 312, 314. The application servers 332, 334 coordinate the requested database transactions for the application clients 302-308. Specifically, the application clients 302-308 request the execution of transactions preferably by issuing application programming interface (API) calls via the communications network 310 to the application servers 332, 334. The application servers 332, 324 then communicate with each other as described below and with their corresponding database servers 312, 314, through conventional RDBMS API calls, such as ORACLE Pro*C® or SYBASE Embedded SQL/C® precompiler statements in order to update the relevant data items in response to the requested transactions.

More specifically, each application server 332, 334 preferably includes a manager process 336, 338 and one or more worker processes 340, 342. The manager processes 336, 338 communicate with each other over the communications network 310 and act as the control centers handling requests from and replies to the application clients 302-308. The manager processes 336, 338 also preferably supervise the replication of data across the system 300 and coordinate the commits and aborts in the corresponding database servers 312, 314. The worker processes 340, 342 communicate directly with their associated database servers 312, 314, respectively. That is, the RDBMS API calls are issued by the worker processes 340, 342 to their associated database management systems 316, 318.

It should be understood that the application servers may reside on the same server computers as their corresponding database servers. Alternatively, the application servers may reside on their own computers. In another embodiment, the worker processes may reside on the same server computer as their associated database servers, while the manager processes reside on their own computers.

Each database server may be implemented as a state machine in which the states are snapshots of the data items while no transactions are in progress and the commands are transactions themselves. Assuming, moreover, that the database servers all begin at the same state, i.e., that each replica of each data item contained within the servers is the same, then, if the same changes are made to each server (assuming that the changes are deterministic), each server should also end up at the same state. That is, each replicated data item will have the same value across the entire system. Furthermore, assuming that the system comprises N+1 actively replicated database servers, then the resulting system is N fault-tolerant. More specifically, with N+1 actively replicated database servers, up to N database servers may fail through crashes, errors, communication failures, etc. and the system will still operate. Thus, an object of the present invention is to coordinate concurrent transaction execution to guarantee consistent replication of data.

One method of achieving this result is to force the transactions to execute serially at each database server. This approach, however, precludes the execution of concurrent transactions (which may result in transactions being executed in different orders in different database servers), and thus considerably limits performance. This solution also fails to address non-deterministic data manipulation language ("dml") instructions. Accordingly, the present invention seeks to maintain consistent states at each replicated database server, while also permitting the concurrent execution of transactions, thereby providing a fault-tolerant system guaranteeing complete data consistency.

The present invention achieves this result by utilizing one of two novel commit protocols that coordinate the execution of concurrent transactions across the system. The first commit protocol is referred to as 1 Phase Coordinated Commit ("1PCC") and the second is referred to 2 Phase Coordinated Commit ("2PCC"). Selection of the appropriate protocol depends on the nature of the transaction. Transactions may be commutative or non-commutative depending on the type of transaction and on the other possible transactions that might be requested by the application clients. A commutative transaction, moreover, is one in which the final state of the replicated database server does not depend on the order in which this transaction executes relative to all other transactions. For example, if the only transaction allowed by the system is a transaction that adds some amount (e.g., $500.00) to a deposit account, then these transactions are commutative. That is, the transactions may be executed in any order and the final values of all deposit accounts at all replicas will be the same. In this case, the system need not ensure that each replicated database server execute the transaction in the same order and thus 1PCC may be implemented as described below, conserving significant communications resources.

A transaction is non-commutative if the final state of the database server is dependent on he order in which this transaction is executed relative to other transactions that might be requested by an application client. For example, the transaction described above would become non-commutative if the system also supported a second transaction that reads the value of a deposit account, multiplies that value by some percentage (e.g., 10%) and adds this amount back to the initial value of the deposit account. Here, these transactions must be executed in each database server in the same order to guarantee data consistency. If the value of a deposit account starts at $1000.00 and one database server executes the first transaction by adding $500 and then executes the second transaction, the final value of the deposit account ($1650.00) will be different than a database server that executes these transactions in reverse order in which case the final value of the deposit account will be $1600.00.

In this situation, the system must utilize the 2PCC protocol described in detail below serializing the execution of these transactions and thus ensuring that all replicated database servers reach the same final result. If a particular replicated database is not able to execute the transaction in the same order as the other databases (e.g., another transaction has a lock on the relevant deposit account number), then as described below the 2PCC protocol causes the transaction to be aborted in each replicated database and the system waits before trying to execute the transaction again.

1 Phase Coordinated Commit

Figure 4:
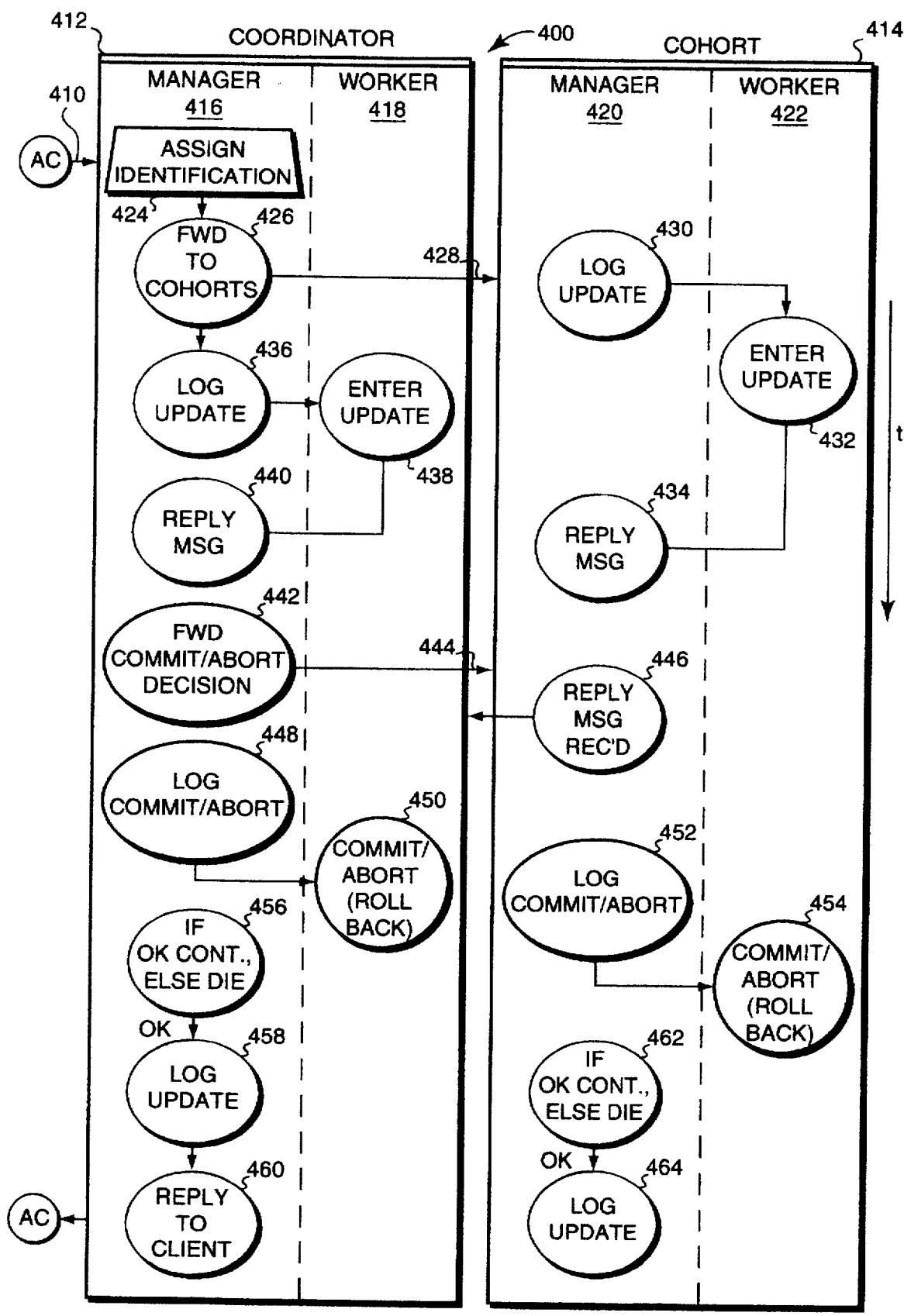
FIG. 4 is a flow diagram of the 1 Phase Coordinated Commit Protocol of the present invention.

FIG. 4 is a highly schematized flow diagram of a 1PCC protocol 400. First, an application client 302 (FIG. 3) sends an API call 410 to the application servers 332, 334 over the communications network 310 requesting the execution of a transaction. A single application server 412 is then designated as a coordinator 412 for the transaction. This designation may be implemented using any selection procedure. For example, the coordinator 412 may be the oldest running application server having a copy of the first data item involved in the transaction. All of the other application servers which maintain a replica of the requisite data items involved in the transaction are designated as cohorts 414. As described above, the coordinator 412 includes a manager process 416 for coordinating the exchange of messages with the cohorts 414 and one or more worker processes 418 for instructing its associated database server (not shown) to perform the operations called for by the transaction. Similarly, each cohort 414 also includes a manager process 420 and one or more worker processes 422. Although the coordinator 412 and the cohorts 414 may include more than one worker process, a single worker process is preferably selected per transaction. The transaction request, moreover, preferably contains information indicating whether the transaction is commutative or non-commutative and the transaction's maximum execution time. If the transaction is commutative, then the coordinator 412 utilizes the 1PCC protocol 400 in order to reduce the amount of communications traffic necessary to execute the transaction.

More specifically, the manager process 416 of the coordinator 412 first assigns a unique transaction identification code to the transaction, as shown by block 424. Next, the manager process 416 forwards the transaction to the cohorts 414, as shown by block 426, via an atomic multicast message 428. An atomic multicast is a transmission technique known to those skilled in the art for sending messages from one process to other processes such that the message is either delivered (not just received) to all of the processes or to none of them at all. Examples of atomic multicast protocols suitable for use in the present invention are described in Chapter 5 of *Distributed Systems* (2nd ed.) edited by S. Mullender (Addison-Wesley 1993) entitled *Fault-Tolerant Broadcasts and Related Problems* and in K. Birman *The Process Group Approach to Reliable Distributed Computing, Communication is of the ACM*, December 1993, the entirety of which are incorporated herein by reference.

Upon receipt of the transaction from the coordinator 412, the manager process 420 of each cohort 414 preferably executes a log update procedure 430 in its own local log (not shown), indicating that the cohort 414 is about to start the transaction. Although not necessary in order to utilize the 1PCC protocol 400, the logging procedures described herein support subsequent recovery should the coordinator 412 or any cohort 414 fail during execution of the 1PCC protocol. The manager 420 of the cohort 414 forwards the message to the worker process 422 and the worker process 422 then issues the necessary update commands 432, instructing the corresponding database server (not shown) to perform the operations associated with the transaction. The worker process 422 then preferably generates a reply message 434 which is saved by the manager process 420. This message is used to reply to the application client 302 (FIG. 3) in the event that this cohort becomes the new coordinator following a failure of the original coordinator. After forwarding the transaction to the cohorts 414, the manager process 416 of the coordinator 412 also preferably executes a log update procedure 436 in its local log, noting that it is about the start the transaction. The manager process 416 forwards the message to the worker process 418 and starts the time-out associated with the transaction. The worker process 418 then issues the necessary update commands 438 directing the corresponding database server to perform the operations associated with the transaction. The worker process 418 also prepares a reply message 440 which is preferably saved by the manager process 416 for later transmission by the coordinator 412.

After waiting for its associated worker process 418 to finish updating the database server or for the transaction-specific time-out to occur, the manager process 416 then determines whether it can commit the transaction or whether the transaction must be aborted and rolled back. If the worker process 418 associated with the coordinator 412 is able to perform all of the operations associated with the requested transaction before the time-out occurs, then the coordinator 412 decides to commit the transaction. Otherwise, the coordinator 412 decides to abort the transaction.

Next, the coordinator 412 communicates its decision (i.e., commit or abort), again via atomic multicast 444, to the cohorts 414. This atomic multicast message, however, also preferably requires a reply from each surviving cohort 414 (i.e., those cohorts who have not failed) signaling, not that the cohort 414 is ready to commit, but that the commit/abort decision simply has been delivered to that cohort. Although the features of an atomic multicast provide that the message will be delivered to all addressed processes (in this case all surviving cohorts) or none of them, atomic multicast by itself does not guarantee that the message will delivered at all. Therefore, a problem might arise, for example, if a coordinator were to send a commit message to all surviving cohorts, immediately commit the transaction at its own database server and then fail. If, as a result of this failure, the commit message is never sent, one of the cohorts will become the new coordinator and should it decide to abort the transaction, then all of the remaining cohorts will be instructed to abort. The old coordinator, however, would have committed the transaction, resulting in a possible inconsistency in the data when the failure is corrected and the old coordinator is returned to the system. By requiring the coordinator 412 to wait for a reply from the cohorts 414 indicating that the decision message 444 was delivered, the 1PCC protocol 400 (and the 2PCC protocol as described below) ensures that the coordinator 412 knows that its decision 444 has been delivered to the cohorts 414 before proceeding to commit the transaction.

If a cohort is unable to proceed with a commit after receiving such an instruction from the coordinator 412, the cohort 414 must "die". In other words, the cohort must remove itself from the system. In this case, the cohort is not permitted to execute an abort and roll back the results, because the cohort, if it were to execute a roll back, may end up in an inconsistent state as compared to the coordinator 412 and the surviving cohorts 414 who proceed with committing the transaction.

Upon receiving a reply from each surviving cohort 414, the manager process 416 of the coordinator 412 preferably executes a log update procedure 448, entering the commit or abort decision in its local log. The log records described heretofore are preferably written to a log buffer residing on volatile storage until the commit/abort decision is entered at which time the log is transferred from the log buffer to stable storage. Depending on the decision, the worker process 418 then either commits the transaction or rolls back the transaction 450 at its corresponding database server. Similarly, each cohort 414, after waiting for its associated worker process 422 to finish updating the corresponding database server, preferably performs a log update 452 in its local log buffer, entering the commit or abort decision received from the coordinator 412. At this point, the log buffer is transferred to stable storage. The cohort worker process 422 then either commits the transaction or rolls back the transaction 454 at its corresponding database server.

Next, the manager process 416 of the coordinator 412 performs a check 456 to determine whether its associated worker process 418 was able to commit the transaction. Assuming that the transaction was properly committed by the coordinator 412, the manager process 416 preferably performs a log update 458 in its local log, noting the completion of the commit and the coordinator 412 thereafter may transmit a reply message 460 to the application client 302 (FIG. 3) that had requested the transaction. The reply message 460 preferably informs the application client 302 that the transaction committed. Similarly, the manager process 420 of the cohort 414 also performs a check 462 to determine whether the worker process 418 was able to commit the transaction. Assuming that the transaction was properly committed by the cohort 414, the cohort manager process 420 preferably performs a log update 464, recording the commit.

2 Phase Coordinated Commit

Figure 5:
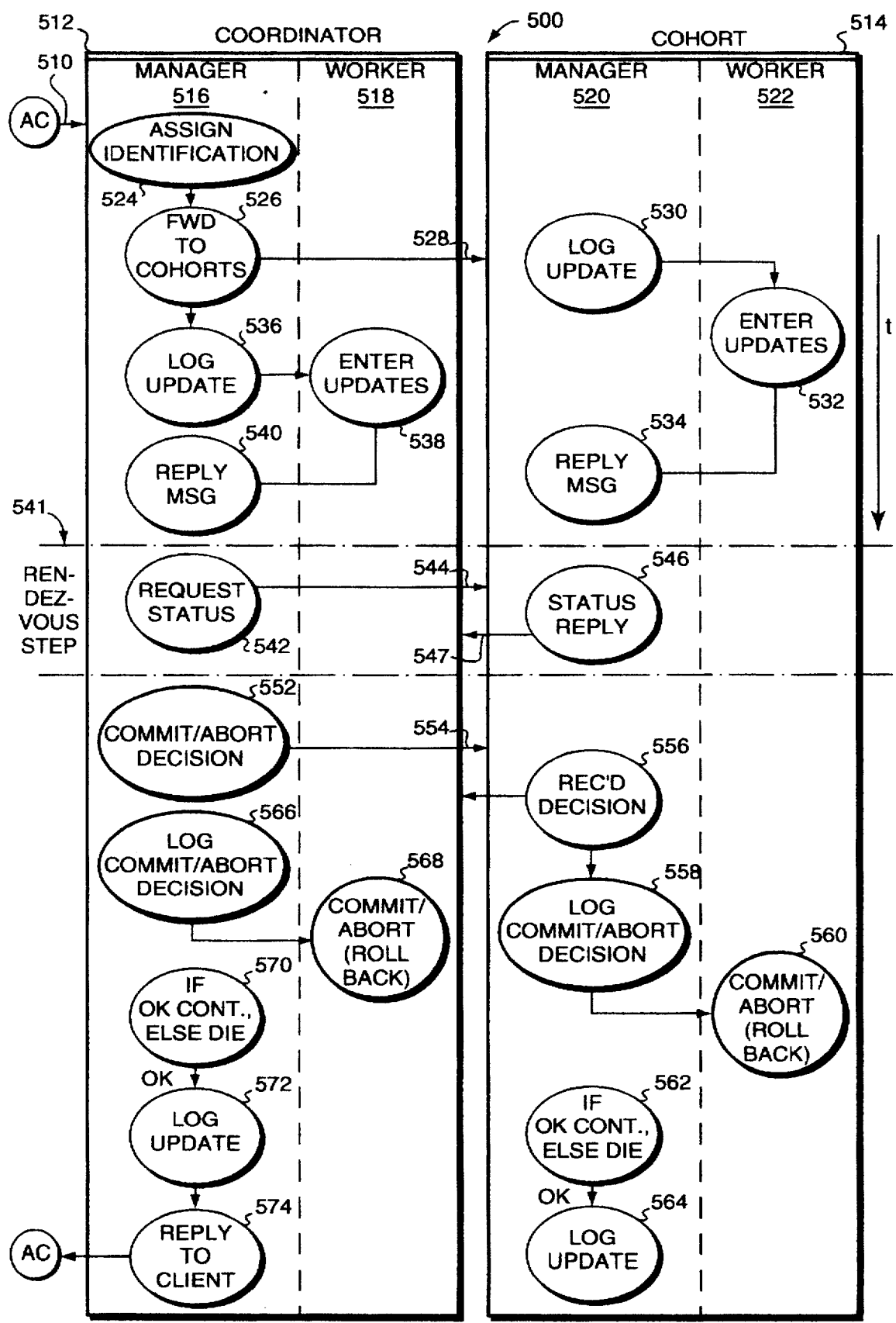
FIG. 5 is a flow diagram of the 2 Phase Coordinated Commit Protocol of the present invention.

FIG. 5 is a highly schematized flow diagram of a 2PCC protocol 500. In general, the 2PCC protocol 500 is nearly identical to the 1PCC protocol 400 (FIG. 4), except that the 2PCC protocol 500 includes an additional step described herein which we refer to as a "rendezvous" step. Although many of the steps are the same, we nonetheless describe the entire 2PCC protocol 500 herein for clarity.

As described above, an application program 302 (FIG. 3) sends an API call 510 to the application servers requesting the execution of a transaction. First, the application servers designate a single application server as a coordinator 512 for the transaction. Again, this designation procedure may be made using any selection procedure. All remaining application servers that contain a replica of the data items involved in the transaction are designated as cohorts 514, as in 1PCC. Again, the transaction request preferably contains information indicating whether the transaction is commutative or non-commutative and its maximum execution time. If the transaction is non-commutative, then the coordinator 512 utilizes the 2PCC protocol 500 to guarantee serializability.

As with the 1PPC protocol 400 (FIG. 4), a manager process 516 of the coordinator 512 first assigns a unique transaction identification code 524 to the particular transaction. Next, as shown by block 526, the manager process 516 forwards the transaction to each cohort 514 using an atomic multicast message 528. Upon receipt, a manager process 520 for each cohort 514 preferably performs a log update function 530 to a log (not shown) and forwards the transaction to a single worker process 522 assigned to this transaction by the cohort 514. The worker process 522 of the cohort 514 then issues a set of update commands, as shown by block 532, to the corresponding database server (not shown), directing the database server to perform the operations of the requested transaction. Again, the cohort worker process 522 generates a reply message 534 that is saved by the manager process 520 for possible transmission.

Referring back to the coordinator 512, the manager process 516 performs a log update 536, indicating that the transaction is to be performed. The manager process 516 then begins the time-out specified by the transaction and instructs the worker process 518 to issue the necessary commands, as shown by block 538. The worker process 518 then generates a reply message 540 which is saved by the manager process 516.

Unlike the 1PPC protocol 400 (FIG. 4), the 2PCC protocol 500 includes a rendezvous step 541 to ensure serializability of the non-commutative transaction across all replicated database servers. The rendezvous step 541 begins when the coordinator 512 finishes its updates or the transaction-specific time-out expires. More specifically, the manager process 516 of the coordinator 512 activates a rendezvous time-out (not shown) and then transmits a status request message 542 to each cohort 514. The rendezvous time-out may be equal to the transaction-specific time-out or it may be different. The status request message 542 inquires whether each cohort 514 is ready and able to commit the transaction. The status request message 542 is sent to each surviving cohort 514 via an atomic multicast 544 across the communications network 310 (FIG. 3). Before responding to the status request message 542, each cohort 514 waits for its associated worker process 522 to finish its instructions to the database server regarding the transaction. The cohort 514 then sends a status reply message 546 to the coordinator 512. If the cohort 514 is able to complete the transaction (i.e., the worker process 522 is able to direct the database server to perform all of the requisite operations), it sends a reply to the coordinator 512 that the cohort 514 is ready to commit the transaction. Otherwise, the cohort 514 replies that it must abort the transaction.

If the coordinator 512 receives an abort message from any surviving cohort 514 or if the rendezvous time-out expires before the coordinator 512 receives a reply from each surviving cohort 514, then the coordinator 512 decides to abort the transaction. If the coordinator 512 receives a ready to commit message from each surviving cohort 514 before the rendezvous time-out occurs and the coordinator worker process 518 was able to finish all requisite updates before the transaction-specific time-out occurred, then the coordinator 512 decides to commit the transaction. It is a feature of the atomic multicast technique that the coordinator 512 only waits for messages from surviving cohorts. The coordinator 512 then transmits a final decision message 552 to the cohorts 514 instructing them to either commit or abort the transaction. As in the 1PPC protocol 400, the decision message 552 is sent via an atomic multicast 554 having a mandatory reply requirement. Upon delivery of the decision message 552 to each cohort 514, each cohort 514 returns a reply message 556 to the coordinator 512, informing the coordinator 512 that its decision message 552 has been delivered to the cohort 514.

The cohort 514 then preferably performs a log update procedure 558 entering the coordinator's commit or abort decision in the log buffer and then transfers the log buffer to stable storage. If the decision message 552 is an abort, the cohort 514 aborts the transaction and the worker process 522 directs the corresponding database server to roll back the results as shown by block 560. If the decision is to commit, the cohort worker process 522 directs the corresponding database server to preserve the results, thereby committing the transaction. Next, the cohort 514 determines whether the commit procedure 560 was properly completed, as shown in block 562, and, if so, the cohort 514 performs a log update procedure 564, indicating that the commitment was accomplished.

Once the coordinator 512 receives a reply message 556 from each surviving cohort 512, the manager process 516 preferably executes a log update procedure 566, entering its decision (i.e., commit or abort), causing the log to move from the log buffer to stable storage. If the decision was to commit the transaction, the worker process 518 directs the corresponding database server to commit the transaction as shown by block 568. The coordinator 512 then similarly performs a check 570 to determine whether the commit 568 was properly entered by the database server and, if so, the manager process 516 performs a log update procedure 572, indicating that the commitment 568 was properly completed. The coordinator 512 then preferably transmits a message 572 to the application client 302 (FIG. 3), informing the application client 302 that the requested transaction has been committed at all surviving replicated database servers.

It should be understood that if the transaction is aborted, the coordinator 512 may wait a preselected amount of time and begin the 2PCC protocol 500 again in an effort to commit the transaction.

The novel protocols of the present invention thus eliminate two of the three previously identified sources of non-determinacy. In particular, each protocol eliminates the second source of non-determinacy by preventing a transaction from committing in one replicated database and aborting in another. That is, under either protocol, if a transaction cannot commit in a single replica despite receiving such an instruction from the coordinator, that replica removes itself from the system (e.g., it is intentionally failed) and the remaining replicas are allowed to commit the transaction and continue processing.

For non-commutative transactions (i.e., those in which the final state of the database is dependent on the order in which the transaction is executed relative to other transactions), the 2PCC protocol is utilized. The 2PCC protocol guarantees consistent replication across all replicas under the assumption that transactions run at the highest level of Two Phase Locking ("2PL"), i.e., repeatable reads plus phantom protection. This follows from the following theorem developed by the applicants: given transactions T and S, if T and S can commit in all replicas in the same order, then T and S will be serialized in the same order in all replicas. 2PL is a conventional locking technique well known to those skilled in the art.

The first source of non-determinacy may be eliminated by directing the application clients to avoid utilizing any dml mechanisms that fail to produce identical results when the identical operations are executed at each database. This may be achieved by preventing application clients from using any dml instruction that relies on local conditions. Such dml instructions include operations that rely on local clocks, local sequence-number generators, the physical location of data at a database, and physical representations of data items, for example Oracle's ROWIDs (i.e., row identifiers).

As shown, both 1PCC and 2PCC preferably support the recovery of failed sites by utilizing a logging procedure.

More specifically, 1PCC and 2PCC use a variant of the conventional log write-ahead protocol which requires each step to be entered in the log before it is performed at the corresponding database. The two protocols, 1PPC and 2PCC, thus permit the continued processing of a transaction (as well as the processing of subsequent transactions) despite cohort or coordinator failure. If a cohort fails prior to receiving a transaction message from a coordinator, for example, the coordinator and the surviving cohorts proceed with the protocol and the failed cohort is simply ignored. When the failed cohort is repaired, the repaired cohort accesses the log of at least one replica to determine what transactions were executed during its failure. The previously failed cohort then updates all of its data items in accordance with the missed transactions and the failed cohort is then ready to be reintegrated into the system. If the cohort fails after performing the necessary updates to its corresponding database server but before committing the transaction, the cohort is again simply ignored by the coordinator and the surviving cohorts for the remainder of the protocol steps. When the failed cohort is repaired, the cohort first accesses its own log to see what transactions were started. The cohort then accesses the log record of at least one other replica to determine whether the open transactions were committed or aborted by the other replicas. If a transaction was aborted, the failed replica rolls back any partial results. If a transaction was committed, the failed cohort completes any unfinished operations and commits the transaction at its corresponding database server.

If a coordinator fails during a protocol, one of the cohorts is declared the replacement coordinator and the protocol proceeds, ignoring the failure of the initial coordinator. Since all of the cohorts and the coordinator are in the identical state, the new coordinator may be selected by any logical selection mechanism. For example, the oldest cohort may be selected as the replacement coordinator. If, during utilization of 2PCC, the coordinator fails before sending the status request message to the cohorts, the new coordinator sends the status request message to the surviving cohorts and follows the selected protocol from that point forward. If the coordinator fails after sending the status request message but before logging its decision to commit or abort the transaction, the new coordinator re-sends the status request message and begins the selected protocol from that point forward. Obviously, if the coordinator fails after logging its commit or abort decision, the new coordinator can simply check the failed coordinator's log and take the necessary steps depending on whether the coordinator decided to commit or abort the transaction. If the new coordinator is unable to access the failed coordinator's log, the new coordinator aborts the transaction and preferably attempts to run it later.

It should be understood that 1PCC and 2PCC may be implemented without any logging procedure. In order to recover a failed site in such an implementation, the entire system must be shut down and the data contained at a current, up-to-date site must be copied to the failed site. The system may then be re-started.

As mentioned above, assuming that the system comprises N+1 actively replicated database servers, then the resulting system is N fault-tolerant. That is, the system will withstand the failure of up to N database servers and continue operating by ignoring the failed sites and allowing transactions to continue processing in the remaining sites. Since the failed sites are essentially ignored, moreover, there is no disruption in service to the application clients as in the primarybackup approach. In addition, well-known failure detection methods, such as those used in the ISIS Toolkit sold by ISIS Distributed Systems, Inc., may be used to tolerate some communications failures. Communications failures which do not result in any site being isolated from the system are harmless, since communication (presumably through alternate routes) remains to all sites. Communications failures which result in the partition of the network into disjoint groups, however, can present a significant problem. In this situation, a system-wide failure detection method is preferably employed to allow only one group of sites to continue processing while shutting the other group(s) of sites down. One such method allows processing to continue only in the group containing a majority of sites. Since each site presumably knows how many sites are in the system, each site can determine whether it is part of the group containing a majority of sites following a network partition. If a site determines that it is not part of a majority group, it automatically shuts itself down.

The preferred implementation of the novel protocols has been described in a system employing commercially available, non-replicated database server products. More specifically, the novel protocols are embedded in and executed by a plurality of application servers which are layered over each commercial database server product. It should be understood that these novel protocols may be implemented directly into a database server, thereby obviating the need for an intermediary layer of application servers. Indeed, in this embodiment, the data manipulation language supporting this hybrid database server may be written so that an application client cannot issue calls that rely on local database conditions. As a result, all three sources of non-determinacy can be eliminated.

The application servers of the preferred embodiment have also been described as including both a manager process and a set of worker processes. This particular embodiment was chosen in order obtain the greatest advantages from existing atomic multicast tools and to support existing, commercially available database server products. More specifically, this implementation allows the worker processes to communicate directly with their corresponding database servers while the manager processes continue to communicate with each other and with the application clients. Nonetheless, it should be understood that the novel protocols described herein may also be implemented by a plurality of application servers in which each application server has a single combined manager-worker process for coordinating the execution of concurrent transactions at each replica and for communicating with its corresponding database server. Such an implementation would require the operating system to support threads, such as the Solaris® operating system by Sun Microsystems and the Windows NT® operating system by Microsoft Corp.

It should be further understood that it might be possible to implement the novel commit protocols with a broadcast technique having somewhat weaker guarantees than atomic multicast.

Figure 6:
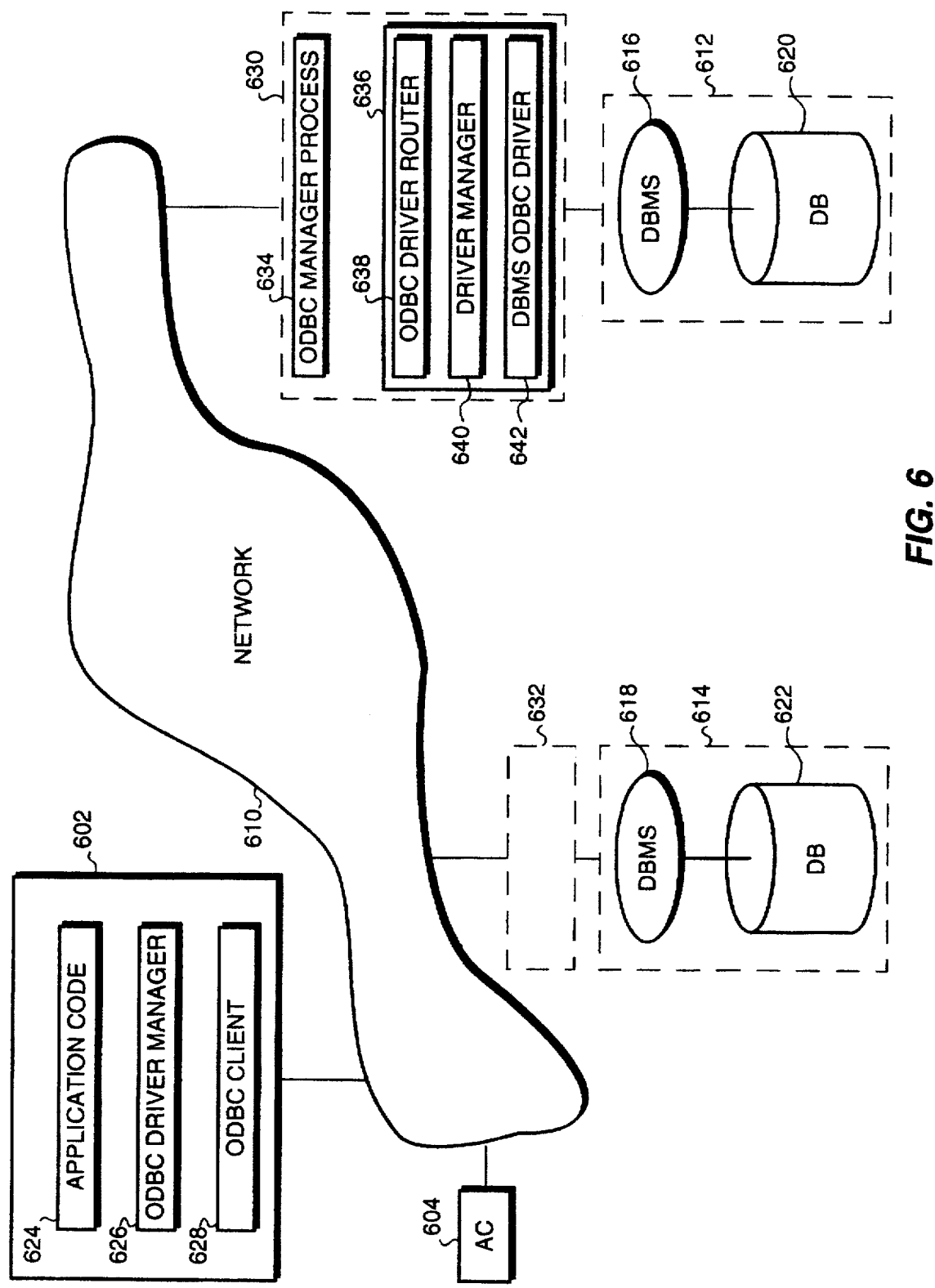
FIG. 6 is a highly schematized block diagram of an alternative embodiment of the database of the present invention.

Referring now to FIG. 6, the novel protocols may also be implemented in a system 600 utilizing Open Database Connectivity ("ODBC"). ODBC is a set of set of industry standard API calls for manipulating a database. The system 600 preferably includes a plurality of application clients 602, 604 and a plurality of database server sites 612, 614 all of which are preferably interconnected via a communication network 610. The application clients 602, 604 use ODBC API calls to access and manipulate particular data items (not shown) stored in the database sites 612, 614. Each database site 612, 614, moreover, includes an ODBC-compatible database management server 616, 618 and a data storage device 620, 622, respectively.

The application clients 602, 604 preferably include at least three layers. First, the application client 602 includes a user-defined application code layer 624. The application code 624 may be generated by commercially available tools, such as Microsoft Access® or may be written in a standard computer language, such as C, to perform the user-defined functions. In order to manipulate data items stored at the database servers 612, 614, the application code 624 issues ODBC API calls to an ODBC driver manager layer 626. The driver manager layer 622, which is essentially a pass-through, directs all ODBC API calls issued by the application code 624 to an ODBC Client layer 628. The ODBC Client layer 628 is a universal driver and typically runs on 32-bit Microsoft Windows-based client machines (e.g., Windows NT® or Windows 95®). It is the ODBC Client layer 628 that actually sends the ODBC API calls across the network 610 to the database sites 612, 614. It should be understood that each application client 602, 604 may run on a client computer 220 (FIG. 2).

Associated with each database site 612, 614, is an ODBC application server 630, 632, respectively. Each ODBC application server 630, 632, moreover, includes an ODBC manager process 634 and one or more worker processes 636, although only one worker process 636 is depicted for the ODBC application server 612. The ODBC manager processes 634 communicate with each other over the network 610 in order to replicate data items and coordinate the execution of concurrent transactions as requested by the application clients 602, 604. The ODBC manager processes 634, for example, execute the novel commit protocols 1PPC 400 (FIG. 4) and 2PCC 500 (FIG. 5).

Each worker process 636, moreover, preferably contains at least three layers. First, the worker process 636 includes an ODBC driver router layer 638. The ODBC driver router layer 638 issues ODBC requests (not shown) on behalf of the application clients 602, 604. Each worker process 636 further includes a driver manager layer 640 and a DBMS ODBC driver layer 642. The driver manager layer 640 is essentially a pass through, directing calls to the DBMS ODBC driver layer 642. The ODBC driver layer 642 is an DBMS-specific driver which translates the ODBC API calls into native database API calls understandable by the database servers 612, 614. The ODBC driver layer 642 may be a commercially available software product, such as Microsoft SQLServer™.

The ODBC application servers 630, 632 execute the novel protocols, 1PPC and 2PCC, in the same manner as described above in connection with the previously described system 300 (FIG. 3) to provide active replication of the data items and guarantee complete data consistency as described above.

It should be understood that each application server 630, 632 may reside on the same server computer 260 (FIG. 2) as its associated database site 612, 614. Alternatively, the database sites 612, 614 may reside on different server computers 260 or even on different networks 210 from their associated ODBC application servers 630, 632. It should be further understood that the manager and worker processes may be combined in a threaded computer environment.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for assuring consistent data replication across a database system during concurrent execution of transactions, the database system having a plurality of application clients for issuing transactions operably connected to a plurality of database servers via a communications network, the method comprising the steps of:

provide a plurality of application servers, each associated with one of the database servers, such that each application server may access and manipulate data stored at its associated database server and communicate with the other application servers and the application clients over the communications network;

designating a selected application server and its associated database server as a coordinator for a selected transaction and designating all other application servers and their associated database servers that contain a replica of data involved in the selected transaction as cohorts;

initiating execution of the selected transaction at the coordinator and cohorts;

forwarding, via an atomic multicast message from the coordinator to each cohort, either a commit decision, if the coordinator is able to execute the transaction, or an abort decision, if the coordinator is unable to execute the transaction;

designating those cohorts receiving the commit or abort decision as surviving cohorts;

receiving an acknowledgment at the coordinator that the commit decision was delivered to all surviving cohorts; and in response to the step of receiving, either committing the selected transaction at the coordinator and surviving cohorts, if the coordinator issues a commit decision or aborting the selected transaction at the coordinator and surviving cohorts, if the coordinator issues an abort decision.

2. The method of claim 1 further comprising the step of forwarding the selected transaction from the coordinator to the cohorts.

3. The method of claim 2 wherein the step of forwarding the selected transaction is via an atomic multicast message.

4. The method of claim 2 wherein the coordinator includes a manager process and at least one worker process whereby the manager process coordinates the exchange of messages between the coordinator and the cohorts and said at least one worker process executes the selected transaction at the database server associated with the coordinator.

5. The method of claim 4 wherein each cohort includes a manager process and at least one worker process whereby the manager process of each cohort communicates with the manager process of the coordinator and said at least one worker process of each cohort executes the selected transaction at the database server associated with that cohort.

6. The method of claim 5 wherein the step of forwarding the selected transaction from the coordinator to each cohort is performed by the manager process of the coordinator utilizing the communications network.

7. The method of claim 6 wherein the step of initiating execution of the selected transaction comprises the steps of:

designating a single worker process of the coordinator and each cohort to execute the selected transaction;

forwarding the selected transaction (i) from the manager process to the designated worker process at the coordinator and (ii) from the manager process to the designated worker process at each cohort; and instructing the associated database servers to execute the selected transaction by the designated worker processes.

8. The method of claim 7 further comprising the step of activating a transaction time-out at the coordinator prior to initiating execution of the selected transaction at the coordinator and wherein the coordinator forwards the commit decision to the cohorts, if the coordinator completes execution of the selected transaction prior to expiration of the transaction time-out.

9. The method of claim 8 wherein the coordinator forwards the abort decision to the cohorts, if the transaction time-out expires before the coordinator completes execution of the selected transaction.

10. The method of claim 9 wherein the step of committing the selected transaction at the coordinator is performed by the designated worker process.

11. The method of claim 10 further comprising the step of intentionally failing each cohort that is unable to commit the selected transaction, removing the cohort from the database system.

12. The method of claim 11 wherein the step of committing the selected transaction at each surviving cohort is performed by the designated worker process.

13. The method of claim 12 further comprising the steps of:

performing a check by the manager process of the coordinator to confirm the step of committing the selected transaction; and transmitting a reply message from the coordinator to the application client that issued the selected transaction, indicating that the selected transaction has been committed.

14. The method of claim 13 further comprising the step of continuing the concurrent execution of transactions despite failure of one or more cohorts.

15. The method of claim 1 wherein each transaction issued by the application clients contains information indicating that the transaction is commutative.

16. The method of claim 1 further comprising the step of designating a selected cohort as a new coordinator upon failure of the coordinator.

17. A method for assuring consistent data replication across a database system during concurrent execution of transactions, the database system having a plurality of application clients for issuing transactions operably connected to a plurality of database servers via a communications network, the method comprising the steps of:

providing a plurality of application servers, each associated with one of the database servers, such that each application server may access and manipulate data stored at its associated database server and communicate with the other application servers and the application clients over the communications network;

designating a selected application server and its associated database server as a coordinator for a selected transaction and designating all other application servers and their associated database servers that contain a replica of data involved in the selected transaction as cohorts;

activating a rendezvous time-out at the coordinator;

initiating execution of the selected transaction at the coordinator and cohorts;

forwarding, via an atomic multicast message from the coordinator to all cohorts, a status request message;

designating those cohorts receiving the status request message as surviving cohorts;

in response to the step of forwarding a status message, transmitting by each surviving cohort either a ready to commit response, if the surviving cohort completes execution of the selected transaction, or an abort response, if the surviving cohort is unable to complete execution of the transaction;

issuing from the coordinator to each cohort either a commit decision, if the coordinator receives a ready to commit response from each surviving cohort prior to the rendezvous time-out expiring and the coordinator completes execution of the transaction, or an abort decision, if (1) the coordinator receives at least one abort response from a surviving cohort, (2) the rendezvous time-out expires before a response is received from each surviving cohort or (3) the coordinator is unable to complete execution of the selected transaction;

either committing the selected transaction at the coordinator and each surviving cohort, if the coordinator issues a commit decision, or aborting the selected transaction at the coordinator and each surviving cohort, if the coordinator issues an abort decision.

18. The method of claim 17 further comprising the step of forwarding the transaction from the coordinator to the cohorts.

19. The method of claim 18 wherein the step of forwarding the transaction from the coordinator to the cohorts is via an atomic multicast message.

20. The method of claim 18 wherein the coordinator includes a manager process and at least one worker process whereby the manager process coordinates the exchange of messages between the coordinator and the cohorts and said at least one worker process executes the selected transaction at the database server associated with the coordinator.

21. The method of claim 20 wherein each cohort includes a manager process and at least one worker process whereby the manager process of each cohort communicates with the manager process of the coordinator and said at least one worker process of each cohort executes the selected transaction at the database server associated with that cohort.

22. The method of claim 21 wherein the step of forwarding the selected transaction from the coordinator to each cohort is performed by the manager process of the coordinator utilizing the communications network.

23. The method of claim 22 wherein the step of initiating execution of the selected transaction at the coordinator and the cohorts comprises the steps of:

designating a single worker process at the coordinator and each cohort to execute the transaction;

forwarding the selected transaction from (i) the manager process to the designated worker process at the coordinator and (ii) the manager process to the designated worker process at each cohort; and instructing the database servers associated with the coordinator and each cohort to execute the transaction by the designated worker processes.

24. The method of claim 23 further comprising the step of activating a transaction time-out at the coordinator prior to initiating execution of the selected transaction at the coordinator and wherein the coordinator issues the commit decision, if the coordinator completes execution of the selected transaction prior to the transaction time-out expiring.

25. The method of claim 24 wherein the coordinator forwards, via an atomic multicast message to each cohort, the abort decision if the transaction time-out expires before the coordinator completes execution of the selected transaction.

26. The method of claim 25 further comprising the step of intentionally failing each cohort that is unable commit the selected transaction, removing the cohort from the database system.

27. The method of claim 25 wherein the step of committing the selected transaction at the coordinator is performed by the designated worker process.

28. The method of claim 27 wherein the step of committing the selected transaction at each cohort is performed by the designated worker process.

29. The method of claim 28 further comprising the steps of:

performing a check by the manager process of the coordinator to confirm the step of committing the selected transaction; and transmitting a reply message from the coordinator to the application client that issued the selected transaction, indicating that the transaction has been committed.

30. The method of claim 29 further comprising the step of continuing the concurrent execution of transactions despite failure of one or more cohorts.

31. The method of claim 17 wherein each transaction issued by the application clients contains information indicating that the transaction is non-commutative.

32. The method of claim 17 further comprising the step of designating a selected cohort as a new coordinator upon failure of the coordinator.

33. The method of claim 1 or 17 wherein each database server is an Open Database Connectivity database application server.

34. A database system capable of supporting concurrent execution of transactions, the database system comprising:

a communications network;

a plurality of application clients operably coupled to the communications network, the application clients capable of issuing the transactions;

a coordinator operably coupled to the communications network, the coordinator including an application server and an associated database server containing a replica of data involved in a selected transaction;

a plurality of cohorts, each operably coupled to the communications network and including an application server and an associated database server containing a replica of data involved in the selected transaction;

means for initiating execution of the selected transaction at the coordinator and cohorts;

means for forwarding, via an atomic multicast message from the coordinator to the cohorts, either a commit decision, if the coordinator completes execution of the selected transaction, or an abort decision, if the coordinator is unable to complete execution of the selected transaction;

means for recognizing those cohorts able to receive the commit or abort decision as surviving cohorts;

means for providing an acknowledgment at the coordinator that the commit decision was delivered to all surviving cohorts; and means for either committing the selected transaction at the coordinator and surviving cohorts, if the coordinator issues a commit decision, or aborting the selected transaction at the coordinator and surviving cohorts, if the coordinator issues an abort decision.

35. The database system of claim 34 further comprising means for designating a selected cohort as a new coordinator upon failure of the coordinator.

36. The database system of claim 35 wherein the application server of the coordinator comprises:

a manager process for communicating with the application clients and the cohorts across the communications network; and at least one worker process for executing transactions at the database server associated with the coordinator.

37. The database system of claim 36 wherein the application server of each cohort comprises:

a manager process for communicating with the coordinator across the communications network; and at least one worker process for executing transactions at the database server associated with the corresponding cohort.

38. The database system of claim 37 further comprising means for intentionally failing a cohort that is unable to commit the selected transaction, thereby removing the cohort from the database system.

39. The database system of claim 38 wherein the coordinator further comprises a transaction time-out that may be activated by the coordinator and further wherein the coordinator forwards the commit decision, if the coordinator completes execution of the selected transaction prior to the transaction time-out expiring.

40. The database system of claim 39 wherein the coordinator forwards the abort decision, if the coordinator is unable to complete execution of the selection transaction prior to the transaction time-out expiring.

41. A database system capable of supporting concurrent execution of transactions, the database system comprising:

a communications network;

a plurality of application clients operably coupled to the communications network, the application clients capable of issuing the transactions;

a coordinator operably coupled to the communications network, the coordinator including an application server and an associated database server containing a replica of data involved in a selected transaction;

a plurality of cohorts, each operably coupled to the communications network and including an application server and an associated database server containing a replica of data involved in the selected transaction;

means for initiating execution of the selected transaction at the coordinator and cohorts;

means for activating a rendezvous time-out at the coordinator prior to execution of the selected transaction at the coordinator;

means for forwarding, via an atomic multicast message from the coordinator to the cohorts, a status request message;

means for recognizing those cohorts receiving the status request message as surviving cohorts;

means for transmitting, in response to the status message, from each surviving cohort either a ready to commit response, if the surviving cohort completes execution of the selected transaction, or an abort response, if the surviving cohort is unable to complete execution of the selected transaction;

means for issuing from the coordinator to the cohorts either a commit decision, if the coordinator receives a ready to commit response from each surviving cohort prior to expiration of the rendezvous time-out and the coordinator completes execution of the selected transaction, or an abort decision, if (1) the coordinator receives at least one abort response from a surviving cohort, (2) the rendezvous time-out expires before a response is received from each surviving cohort or (3) the coordinator is unable to complete execution of the selected transaction; and means for either committing the selected transaction at the coordinator and surviving cohorts, if the coordinator issues a commit decision, or aborting the selected transaction at the coordinator and surviving cohorts, if the coordinator issues an abort decision.

42. The database system of claim 41 further comprising means for designating a selected cohort as a new coordinator upon failure of the coordinator.

* * * * *